United States Patent
Nobiki

(10) Patent No.: US 10,022,715 B2
(45) Date of Patent: Jul. 17, 2018

(54) MANUFACTURING METHOD OF HONEYCOMB STRUCTURE

(71) Applicant: NGK INSULATORS, LTD., Nagoya (JP)

(72) Inventor: Kosuke Nobiki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/434,365

(22) Filed: Feb. 16, 2017

(65) Prior Publication Data

US 2017/0246622 A1 Aug. 31, 2017

(30) Foreign Application Priority Data

Feb. 29, 2016 (JP) .................................. 2016-037845

(51) Int. Cl.
| | |
|---|---|
| *B01J 21/04* | (2006.01) |
| *B01J 23/02* | (2006.01) |
| *B01J 35/04* | (2006.01) |
| *B01J 21/08* | (2006.01) |
| *B01J 35/10* | (2006.01) |
| *B01J 37/00* | (2006.01) |
| *B01J 37/08* | (2006.01) |
| *B28B 3/20* | (2006.01) |
| *B28B 11/24* | (2006.01) |

(52) U.S. Cl.
CPC .............. *B01J 35/04* (2013.01); *B01J 21/08* (2013.01); *B01J 35/1019* (2013.01); *B01J 35/1023* (2013.01); *B01J 37/0009* (2013.01); *B01J 37/08* (2013.01); *B28B 3/20* (2013.01); *B28B 11/243* (2013.01); *B28B 2003/203* (2013.01)

(58) Field of Classification Search
CPC ... B01J 35/04; B01J 21/08; B01J 37/08; B01J 35/1023; B01J 37/0009; B01J 35/1019; B28B 11/243; B28B 3/20; B28B 2003/203
USPC ....................................................... 502/439
See application file for complete search history.

(56) References Cited

U.S. PATENT DOCUMENTS

| | | | |
|---|---|---|---|
| 6,300,266 B1 | 10/2001 | Beall et al. | |
| 7,723,250 B2 | 5/2010 | Hayashi et al. | |
| 2006/0208397 A1* | 9/2006 | Ichikawa | B28B 3/206 |
| | | | 264/631 |
| 2007/0225149 A1* | 9/2007 | Hayashi | C04B 35/195 |
| | | | 501/80 |

FOREIGN PATENT DOCUMENTS

| | | |
|---|---|---|
| DE | 699 05 315 T2 | 10/2003 |
| WO | 2005/090263 A1 | 9/2005 |

* cited by examiner

*Primary Examiner* — Haytham Soliman
(74) *Attorney, Agent, or Firm* — Burr & Brown, PLLC

(57) ABSTRACT

The manufacturing method of the honeycomb structure includes a raw material preparing step of adding the powder of porous silica as the inorganic pore former to a forming raw material and kneading the forming raw material to prepare the kneaded forming raw material, an extruding step of extruding the obtained forming raw material to form a honeycomb formed body, and a firing step of firing the extruded honeycomb formed body to form a honeycomb structure containing a cordierite component, and an amount of oil to be absorbed by the porous silica to be added to the forming raw material is in a range of 50 to 190 ml/100 g, and a BET specific surface area of the porous silica is in a range of 340 to 690 m$^2$/g.

5 Claims, 2 Drawing Sheets

MANUFACTURING METHOD OF HONEYCOMB STRUCTURE

"The present application is an application based on JP-2016-037845 filed on Feb. 29, 2016 with Japan Patent Office, the entire contents of which are incorporated herein by reference."

BACKGROUND OF THE INVENTION

Field of the Invention

The present invention relates to a manufacturing method of a honeycomb structure, and more particularly, it relates to a manufacturing method of a honeycomb structure in which it is especially possible to inhibit generation of partition wall cracks during manufacturing of a cordierite honeycomb structure containing a cordierite component.

Description of the Related Art

Heretofore, honeycomb structures made of ceramics have been used in broad use applications of a car exhaust gas purifying catalyst carrier, a diesel particulate removing filter, a heat reservoir for a burning device, and the like. Here, the honeycomb structure is manufactured by preparing a forming raw material (a kneaded material), desirably extruding the material in the form of a honeycomb by use of an extruder, and further firing a rawly cut, dried and end-face finished honeycomb formed body at a high temperature.

Especially in recent years, there has been manufactured a cordierite honeycomb structure (hereinafter referred to simply as "the honeycomb structure") containing a cordierite component constituted of three components of silicon, aluminum, and magnesium.

The cordierite component has characteristics that its thermal expansion coefficient is lower than that of an alumina material and that the cordierite component is excellent in thermal shock resistance and withstanding strength. Therefore, the honeycomb structure is employed in a broad field of the car exhaust gas purifying catalyst carrier and the like.

When manufacturing a ceramics porous body such as the above honeycomb structure, there is performed an operation of adding powder of porous silica or powder of a porous silica-containing mixture (hereinafter generically referred to as "the powder of porous silica" in the present specification) as an inorganic pore former into a forming raw material, kneading the forming raw material, and extruding the kneaded forming raw material (see Patent Document 1).

When the powder of porous silica is used as the inorganic pore former, there is the advantage that it is possible to inhibit generation of carbon dioxide or a toxic gas, as compared with resin powder or carbon powder which has heretofore been used as the inorganic pore former. Furthermore, the powder of porous silica contains a combustible content which is smaller than that of the resin powder or the like, and hence it is possible to shorten a burning time.

[Patent Document 1] WO 2005/090263

SUMMARY OF THE INVENTION

However, it is known that the above powder of porous silica has water absorbable properties (or moisture absorbable properties). Therefore, water added to a forming raw material might be held in the silica powder or water in air might be absorbed by the silica powder. As a result, there is the tendency that a ratio of water to be included in a kneaded material (a kneaded material water ratio) increases as compared with conventional resin powder or the like.

Here, when the kneaded material water ratio increases, a large amount of water in the kneaded material evaporates in a process of drying an extruded honeycomb formed body. As a result, partition walls of the honeycomb formed body might shrink to be deformed. In consequence, there is the fear that due to the generation of defects such as "partition wall cracks" in which parts of the lattice-like partition walls are divided, a final product quality of a honeycomb structure deteriorates.

To eliminate such problems, the present invention has been developed in view of the above circumstances, and an object thereof is to provide a manufacturing method of a honeycomb structure containing a cordierite component in which it is possible to minimize a kneaded material water ratio and it is possible to inhibit generation of partition wall cracks and others in a case of using powder of porous silica as an inorganic pore former.

According to the present invention, there is provided a manufacturing method of a honeycomb structure to achieve the above object.

According to a first aspect of the present invention, a manufacturing method of a honeycomb structure is provided including a raw material preparing step of adding powder of porous silica as an inorganic pore former to a forming raw material and kneading the forming raw material to prepare the kneaded forming raw material, an extruding step of extruding the obtained forming raw material to form a honeycomb formed body, and a firing step of firing the extruded honeycomb formed body to form the honeycomb structure containing a cordierite component and having partition walls defining a plurality of cells which become through channels for a fluid and extend from one end face to the other end face, wherein an amount of oil to be absorbed by the porous silica to be added to the forming raw material is in a range of 50 to 190 ml/100 g, and a BET specific surface area of the porous silica is in a range of 340 to 690 $m^2/g$.

According to a second aspect of the present invention, the manufacturing method of the honeycomb structure according to the above first aspect is provided, wherein a bulk density of the porous silica is in a range of 0.15 to 0.64 $g/cm^3$.

According to a third aspect of the present invention, the manufacturing method of the honeycomb structure according to the above first or second aspects is provided, wherein a 50% particle diameter ($D_{50}$) of the porous silica is in a range of 4 to 24 μm.

According to a fourth aspect of the present invention, the manufacturing method of the honeycomb structure according to any one of the above first to third aspects is provided, wherein a honeycomb porosity of the honeycomb structure is in a range of 40 to 55%.

According to a fifth aspect of the present invention, the manufacturing method of the honeycomb structure according to any one of the above first to fourth aspects is provided, wherein in the firing step, the porous silica is molten, reacts with another component contained in the forming raw material to be converted into cordierite, and constitutes a part of the honeycomb structure.

According to a manufacturing method of a honeycomb structure of the present invention, it is possible to obtain the honeycomb structure which stabilizes a product quality without causing any deformations such as partition wall cracks during drying of a honeycomb formed body, exerts a high light-off performance, and improves a purification efficiency.

DESCRIPTION OF THE PREFERRED EMBODIMENTS

Hereinafter, an embodiment of a manufacturing method of a honeycomb structure of the present invention will be described in detail with reference to the drawings. It is to be noted that the manufacturing method of the honeycomb structure of the present invention is not limited to the following embodiment, and various design changes, modifications, improvements and others can be added without departing from the gist of the present invention.

1. Honeycomb Structure, and Manufacturing Method of Honeycomb Structure

Figure 1:
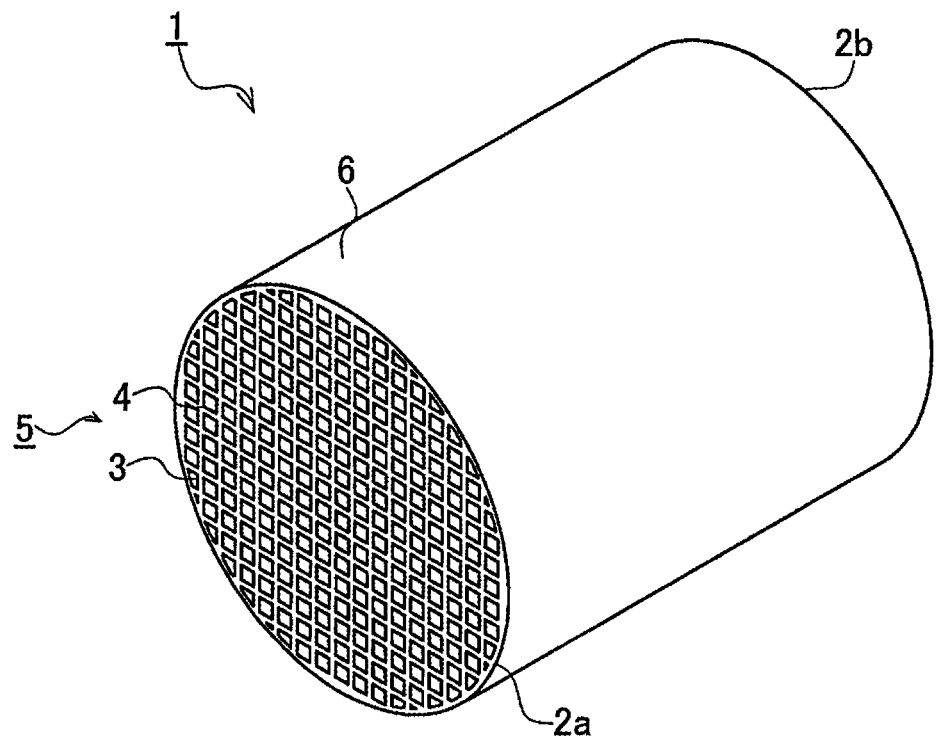
FIG. 1 is a perspective view schematically showing one example of a honeycomb structure of one embodiment of the present invention.
Figure 2:
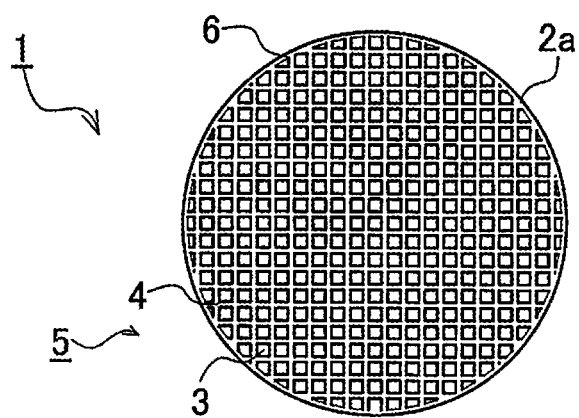
FIG. 2 is a plan view schematically showing the one example of the honeycomb structure.

A honeycomb structure 1 manufactured by a manufacturing method of the honeycomb structure of the present embodiment includes, as shown in FIG. 1 and FIG. 2, a honeycomb structure body 5 having lattice-like partition walls 4 defining a plurality of cells 3 which form through channels for a fluid and extend from one end face 2a to the other end face 2b, and a circumferential wall portion 6 disposed around the honeycomb structure body 5, and possesses a substantially round pillar shape.

The honeycomb structure 1 is a cordierite honeycomb structure containing, as one type of porous ceramics material, a cordierite component constituted of three components of silicon, aluminum and magnesium which are constituent elements. It is to be noted that there is not any special restriction on ratios of the respective components of the cordierite component, but the cordierite component is usable in which, for example, when a total ratio in a case of converting the above three components in terms of oxides is 100%, silicon oxide (silica) is in a range of 50% or more, aluminum oxide (alumina) is in a range of 15 to 45%, and magnesium oxide (magnesia) is in a range of 5 to 30%.

Powder of porous silica (not shown) is added in a predetermined range to a forming raw material containing the above cordierite component, and a kneaded fowling raw material is prepared (a raw material preparing step). Here, as the powder of porous silica, silica powder of an intermediate shape (amorphous silica powder) is suitably used, and specifically, silica gel or the like is usable. It is to be noted that as a porous silica-containing mixture, an intermediately shaped silica-containing mixture is suitably usable.

The kneaded forming raw material is extruded by using a well-known extruder to obtain a honeycomb formed body of a desirable shape (an extruding step). Afterward, the honeycomb formed body is dried, introduced into a firing furnace set at a stipulated firing temperature, and then fired (a firing step). Consequently, there is manufactured the honeycomb structure 1 having the partition walls 4 defining the cells 3 which are the through channels for the fluid and extend from the one end face 2a to the other end face 2b. Here, there is not any special restriction on the firing temperature, but the temperature can be set to a range of, for example, 1200° C. to 1300° C.

Here, the forming raw material for use may contain another component, except for the above cordierite component and the above powder of porous silica. For example, the forming raw material may contain a natural raw material of kaolin or talc, or a synthetic raw material of alumina or aluminum hydroxide, or various other components. However, it is necessary to maintain the above composition of the cordierite component, and as long as this condition is satisfied, the above addition of the other component may be omitted.

Furthermore, in the firing step of firing, at a high firing temperature, "the other component" in the forming raw material, e.g., the above natural raw material or the above synthetic raw material and the powder of porous silica, the component and the powder may react to be converted into the cordierite composition. In this case, a part of porous silica is molten and consumed as silicon oxide which constitutes a part of the cordierite component.

Furthermore, the powder of porous silica to be added to the forming raw material in the raw material preparing step is used in which an amount of oil to be absorbed is set to a range of 50 to 190 ml/100 g and a BET specific surface area is set to a range of 340 to 690 m$^2$/g. That is, in the manufacturing method of the honeycomb structure of the present embodiment, properties of porous silica as an inorganic pore former to be added to the forming raw material which becomes a starting material are stipulated by combining two parameters of "the amount of the oil to be absorbed" and "the BET specific surface area".

As a result, it is possible to minimize a water ratio of the kneaded forming raw material (a kneaded material water ratio). Consequently, also in a case of using the powder of porous silica, it is possible to inhibit shrinkage and deformation of the partition walls during drying, and it is possible to prevent generation of partition wall cracks.

Here, the amount of the oil to be absorbed stipulates the amount of the oil to be absorbed by a powder body under constant conditions, and the amount of the oil relative to 100 g of powder body is represented by a volume (ml) or an oil weight (g). Specifically, the amount is calculated by a measurement method stipulated in JIS K5101-13-1 (or JIS K5101-13-2).

Further specifically, a sample in the form of the powder body whose weight is accurately measured (in this case, porous silica) is placed on a measurement plate, and the oil (linseed oil) is dropped as much as four or five drops from a burette to the vicinity of a center of the sample at one time.

Further, the whole sample is sufficiently kneaded with a palette knife every dropping time. This operation of dropping the oil and kneading the sample is repeated until the whole sample becomes a hard putty billet. Afterward, the dropping of the oil from the burette is changed to dropping of one drop of oil every time, and the sample is similarly kneaded with the palette knife. Furthermore, with the last one drop, the sample can spirally be wound by using the palette knife, and this state is defined as an end point of measurement.

When reaching the end point, the amount of the oil to be dropped in the burette is read, and a volume (ml) of the oil per 100 g of sample is calculated by using Equation (1) in which $O_1$ is the amount of the oil to be absorbed (ml/100 g), V is a volume (ml) of the consumed linseed oil, and m is a weight (g) of the sample as follows:

$$O_1 = (100 \times V)/m. \qquad \text{Equation (1):}$$

It is to be noted that in a case of indicating the weight (g) of the oil for 100 g of the sample, the amount of the oil to be absorbed is calculated by using Equation (2) in which $O_2$ is the amount of the oil to be absorbed (g/100 g), V is the volume (ml) of the consumed linseed oil, and m is the weight (g) of the sample as follows:

$$O_2=(93\times V)/m. \qquad \text{Equation(2):}$$

On the other hand, the BET specific surface area can be, for example, a value measured in conformity with description of JIS R1626 (a measurement method of a specific surface area by a gas adsorption BET adsorption method of a fine ceramics powder body). Specifically, a sample (porous silica) is placed in an adsorption cell, the cell is evacuated while heating the cell, thereby removing gas molecules adsorbed on the surface of the sample, and a weight of the sample is measured.

Afterward, a nitrogen gas is passed through the adsorption cell in which the sample is enclosed. As a result, nitrogen is adsorbed on the surface of the sample, and furthermore, an amount of the nitrogen gas to flow inside is increased, whereby the gas molecules form a plurality of layers on the surface of the sample.

At this time, a graph is prepared by plotting the above process as a change of an adsorption amount relative to a pressure change, and from the obtained graph, an amount of the gas molecules to be adsorbed only on the surface of the sample is obtained by a BET adsorption isotherm equation. At this time, concerning nitrogen molecules, an adsorption occupying area is already known, and hence a surface area of the sample can be obtained on the basis of the amount of the gas molecules to be adsorbed.

Furthermore, as to porous silica for use in the manufacturing method of the honeycomb structure of the present embodiment, a bulk density is in a range of 0.15 to 0.64 g/cm$^3$, a value of a 50% particle diameter ($D_{50}$) is in a range of 4 to 24 μm, and a honeycomb porosity of the manufactured honeycomb structure is in a range of 40 to 55%.

The bulk density is obtained by dividing a bulk volume of porous silica by a weight thereof and can be measured by using a commercially available bulk density meter. Furthermore, the 50% particle diameter ($D_{50}$) is generally called "a median diameter" and indicates a particle diameter in a case where a relative particle amount becomes 50% relative to a particle diameter scale of porous silica in the form of the powder.

On the other hand, the honeycomb porosity indicates a porosity of the partition walls constituting the honeycomb structure. It is to be noted that in the manufacturing method of the honeycomb structure of the present embodiment, the concerned honeycomb porosity indicates a value measured on the basis of mercury porosimetry which conforms to JIS R1655.

That is, in addition to the above-mentioned stipulation by two parameters, i.e., the amount of the oil to be absorbed and the BET specific surface area in porous silica, the bulk density of porous silica and the 50% particle diameter thereof are further restricted, and the range of the honeycomb porosity of the fired honeycomb structure is stipulated, so that it is possible to manufacture the honeycomb structure which further inhibits increase of the kneaded material water ratio and prevents generation of defects such as the partition wall cracks.

Additionally, it is possible to stably manufacture the honeycomb structure having a high porosity, and a so-called "light-off performance" can improve. Here, "the light-off performance" indicates temperature characteristics developed by a purifying performance of a catalyst loaded onto the honeycomb structure.

That is, the honeycomb structure has excellent characteristics that the temperature of the honeycomb structure rapidly rises to a temperature at which it is possible to exert a high purification performance, in a comparatively short time from start of purification, when starting the purification by the honeycomb structure. When the porosity of the honeycomb structure increases, a heat capacity decreases, a temperature of the catalyst rises faster, and the light-off performance improves. Due to the improvement of the light-off performance, the honeycomb structure manufactured by the manufacturing method of the honeycomb structure of the present embodiment can exert the high purification performance.

Hereinafter, examples of the manufacturing method of the honeycomb structure of the present invention will be described, but the manufacturing method of the honeycomb structure of the present invention is not limited to these examples.

EXAMPLES

1. Measurement of Properties of Silica

First, there were prepared a plurality of types of silica powder which had different amounts of oil to be absorbed and different BET specific surface areas. Further, by the above-mentioned measurement methods or the like, there were measured various properties such as the amount of the oil to be absorbed, the BET specific surface area, a bulk density and a 50% particle diameter. It is to be noted that Table 1 shows the obtained measurement results as follows. As shown in Table 1, in the present embodiment, 15 types of silica were prepared in total to manufacture honeycomb structures of Examples 1 to 7 and Comparative Examples 1 to 8, respectively. In Comparative Example 1, crystalline silica was prepared, and in the other Examples and Comparative Examples, porous silica was prepared.

2. Preparation of Forming Raw Material, and Kneading

As described above, various properties of porous silica were measured, the same amount of porous silica was added to each forming the raw material which contained a cordierite composition at a constant ratio, and the material was kneaded to prepare the forming raw material to be extruded (a raw material preparing step). The kneading means that an aid, water and the like are added to a ceramics forming raw material, and the material is kneaded to obtain a plastic kneaded material. At this time, an amount of the water to be added to a mixture of the forming raw material and porous silica was adjusted to obtain the same kneaded material hardness. As a result, a plurality of forming raw materials having the constant kneaded material hardness were obtained.

3. Measurement of Kneaded Material Water Ratio

A content of the water contained in the kneaded forming raw material was measured and a kneaded material water ratio was calculated. That is, the kneaded material water ratio indicates a ratio of the water in % in a case of defining, as 100, a total weight of the forming raw material containing porous silica and water. Table 1 shows the values of the calculated kneaded material water ratio as follows.

In consequence, in the case where the amount of the oil to be absorbed by porous silica was in a range of 50 to 190 ml/100 g (Examples 1 to 6), the kneaded material water ratio of the forming raw material was approximately in a range of 30% or more and smaller than 35%. On the other hand, in a case where the amount of the oil to be absorbed was 200 ml/100 g or more, the kneaded material water ratio was 35% or more, and especially in a case where the amount of the oil to be absorbed was in a range of 240 to 250 ml/100 g (Comparative Examples 6 to 8), the kneaded material water ratio increased to 38% or more. On the other hand, even when the amount of the oil to be absorbed was 250 ml/100 g or more (Comparative Example 2 or 5), the kneaded material water ratio indicated a low value in a case where the bulk density was 0.10 g/cm$^3$ or less. Consequently, it has been confirmed that the amount of the oil to be absorbed by a porous silica to be added noticeably contributes to the kneaded material water ratio.

4. Formation of Honeycomb Formed Body

The forming raw material was extruded by using an extruder (an extruding step). Consequently, there was obtained the honeycomb formed body having lattice-like partition walls defining a plurality of cells. Additionally, a forming die attached to an extrusion port of the extruder was adjusted to be constant, whereby respective items such as cell densities and partition wall thicknesses of the respective honeycomb formed bodies formed by adding porous silica thereto indicated the same values. Each extruded honeycomb formed body was dried and further cut into a constant size.

5. Firing of Honeycomb Formed Body and Formation of Honeycomb Structure

The dried and cut honeycomb formed body was thrown into a firing furnace and fired on firing conditions of stipulated firing temperature and firing time (a firing step). Consequently, it was possible to obtain the honeycomb structure containing a cordierite component (a cordierite honeycomb). In the present embodiment, there were formed 15 types of honeycomb structures of Examples 1 to 7 and Comparative Examples 1 to 8 in total. A cell shape of each honeycomb structure was quadrangular, the cell density was 46.5 cells/cm$^2$, the partition wall thickness was 0.089 mm, a diameter was 110 mm, and a length was 97 mm.

6. Measurement of Honeycomb Pore Diameter

As to each of the obtained honeycomb structures, a honeycomb porosity of the partition walls of the honeycomb structure was measured in conformity of mercury porosimetry. Table 1 shows the values of the measured honeycomb porosity as follows.

7. Presence/Absence of Generation of Partition Wall Cuts

In each of the honeycomb structures of Examples 1 to 7 and Comparative Examples 1 to 8, especially each end face was visually confirmed and there was evaluated presence/absence of "partition wall cracks" indicating that shrinkage and deformation of the partition walls occurred with evaporation of the water in the forming raw material during drying and parts of the partition walls were divided. Table 1 shows the evaluation results as follows.

Here, Table 1 shows an example where there are not any partition wall cracks as "excellent" and shows an example where the partition wall cracks are present as "failure". Consequently, in each of the honeycomb structures in which porous silica satisfying requirements of the present invention was used and the honeycomb porosity was in the stipulated range, any partition wall cracks were not present, and the honeycomb structure had a suitable product quality. On the other hand, in each of the honeycomb structures (Comparative Examples 4 to 8) in which the amount of the oil to be absorbed by porous silica was in excess of 190 ml/100 g and the kneaded material water ratio was high, the evaluation of the partition wall cracks indicated "failure". That is, the amount of the oil to be absorbed, the kneaded material water ratio and the presence/absence of the partition wall cracks are especially correlated.

8. Light-Off Performance

A light-off performance was evaluated on the basis of a residual ratio of total hydrocarbons (THC) of specific hydrocarbon conversion in a cold phase of NEDC mode as to each honeycomb structure onto which a three-way catalyst was loaded by a known method. In this case, the THC residual ratio of Comparative Example 1 was defined as 1.00, and relative to this comparative example, an example where the residual ratio of THC was smaller than 0.97 was judged as "excellent", an example where the ratio was 0.97 or more and smaller than 0.99 was judged as "good", and an example where the ratio was 0.99 or more was judged as "failure". Table 1 shows the measurement results of the THC residual ratio as follows.

Consequently, in the honeycomb structures of Examples 1 to 7, the light-off performance was "excellent" or "good". On the other hand, especially in the honeycomb structure in which the honeycomb porosity was 40% or less (Comparative Examples 1 to 4), the THC residual ratio was 0.99 or more and the light-off performance was "failure". Furthermore, in the honeycomb structure of Example 7 where the BET specific surface area was close to an upper limit value and the honeycomb porosity was close to a lower limit value, the light-off perfoiinance was "good". That is, the correlation is recognized between the honeycomb porosity and the THC residual ratio (the light-off performance).

9. Judgment

In a case where each of the evaluation items of the partition wall cracks and the light-off performance was "excellent", general judgment indicated "excellent". On the other hand, in a case where at least one of the evaluation items was "good", general judgment indicated "good", and in a case where at least one of the evaluation items was "failure", general judgment indicated "failure". Table 1 shows the results as follows.

TABLE 1

| | Porous silica | | | | Forming raw material | Honeycomb structure | | | | |
| --- | --- | --- | --- | --- | --- | --- | --- | --- | --- | --- |
| | Amount of oil to be absorbed/ ml/100 g | Specific surface area/ m$^2$/g | Bulk density/ g/cm$^3$ | 50% particle dia./ μm | Kneaded material water ratio/ % | Honeycomb porosity/ % | Partition wall cracks | THC residual ratio/ % | Light-off performance | Judgment |
| Example 1 | 160 | 340 | 0.37 | 24.0 | 34.4 | 49.8 | Excellent | 0.96 | Excellent | Excellent |
| Example 2 | 185 | 410 | 0.27 | 11.0 | 34.5 | 49.6 | Excellent | 0.96 | Excellent | Excellent |
| Example 3 | 190 | 431 | 0.22 | 4.3 | 34.4 | 46.5 | Excellent | 0.97 | Good | Good |
| Example 4 | 134 | 568 | 0.37 | 14.0 | 33.1 | 52.3 | Excellent | 0.95 | Excellent | Excellent |
| Example 5 | 182 | 568 | 0.15 | 6.3 | 33.7 | 45.8 | Excellent | 0.97 | Good | Good |
| Example 6 | 80 | 650 | 0.64 | 8.0 | 30.9 | 45.5 | Excellent | 0.97 | Good | Good |
| Example 7 | 110 | 690 | 0.47 | 4.7 | 31.8 | 41.6 | Excellent | 0.98 | Good | Good |

TABLE 1-continued

| | Porous silica | | | | Forming raw material | Honeycomb | | | | |
|---|---|---|---|---|---|---|---|---|---|---|
| | Amount of oil to be absorbed/ ml/100 g | Specific surface area/ m²/g | Bulk density/ g/cm³ | 50% particle dia./ μm | Kneaded material water ratio/ % | structure Honeycomb porosity/ % | Partition wall cracks | THC residual ratio/ % | Light-off performance | Judgment |
| Comparative Example 1 | Unmeasurable | 4 | 0.34 | 2.5 | 25.0 | 35.0 | Excellent | 1.00 | Failure | Failure |
| Comparative Example 2 | 255 | 200 | 0.08 | 7.0 | 32.3 | 34.0 | Excellent | 1.00 | Failure | Failure |
| Comparative Example 3 | 155 | 260 | 0.17 | 7.4 | 30.5 | 38.8 | Excellent | 0.99 | Failure | Failure |
| Comparative Example 4 | 260 | 240 | 0.07 | 5.0 | 35.2 | 37.5 | Failure | 0.99 | Failure | Failure |
| Comparative Example 5 | 250 | 310 | 0.13 | 7.5 | 38.2 | 47.9 | Failure | 0.96 | Excellent | Failure |
| Comparative Example 6 | 250 | 360 | 0.19 | 6.0 | 39.6 | 48.9 | Failure | 0.96 | Excellent | Failure |
| Comparative Example 7 | 240 | 360 | 0.24 | 12.0 | 38.2 | 50.1 | Failure | 0.95 | Excellent | Failure |
| Comparative Example 8 | 200 | 550 | 0.25 | 10.5 | 35.9 | 49.0 | Failure | 0.96 | Excellent | Failure |

Figure 3:
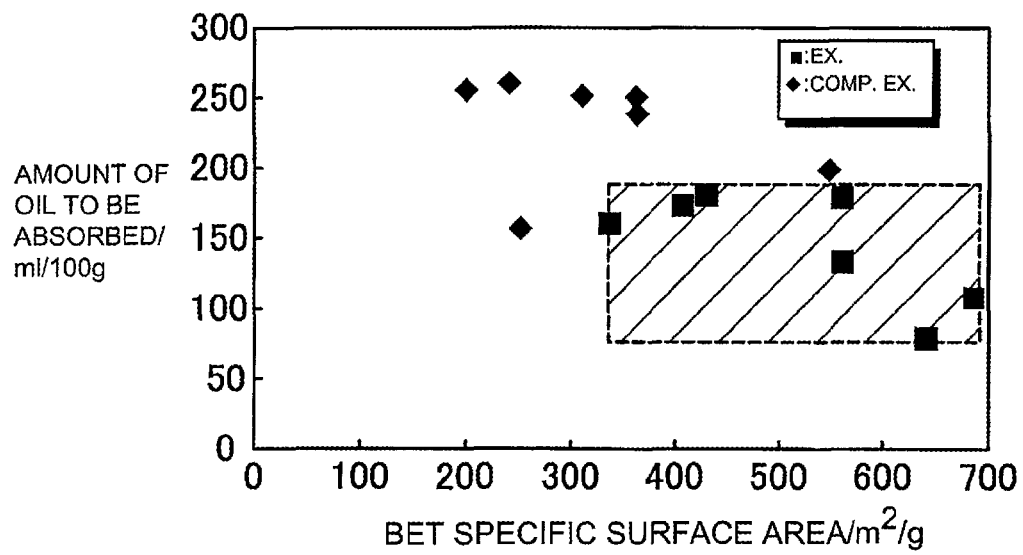
FIG. 3 is a graph showing a correlation of an amount of oil to be absorbed relative to a specific surface area.

10. Correlation Between BET Specific Surface Area and Amount of Oil to be Absorbed FIG. 3 is a graph showing the BET specific surface area along the abscissa, showing the amount of the oil to be absorbed along the ordinate, and showing plotted results of the respective values of Examples 1 to 7 and Comparative Examples 1 to 8. In consequence, it is presumed that in the manufacturing method of the honeycomb structure of the present invention, it is possible to suitably use porous silica having the BET specific surface area and the amount of the oil to be absorbed which satisfy a hatched region in the graph, and it is possible to manufacture the honeycomb structure which does not have any partition wall cracks and which is excellent in light-off performance.

11. Correlation Between Kneaded Material Water Ratio and Honeycomb Porosity

Figure 4:
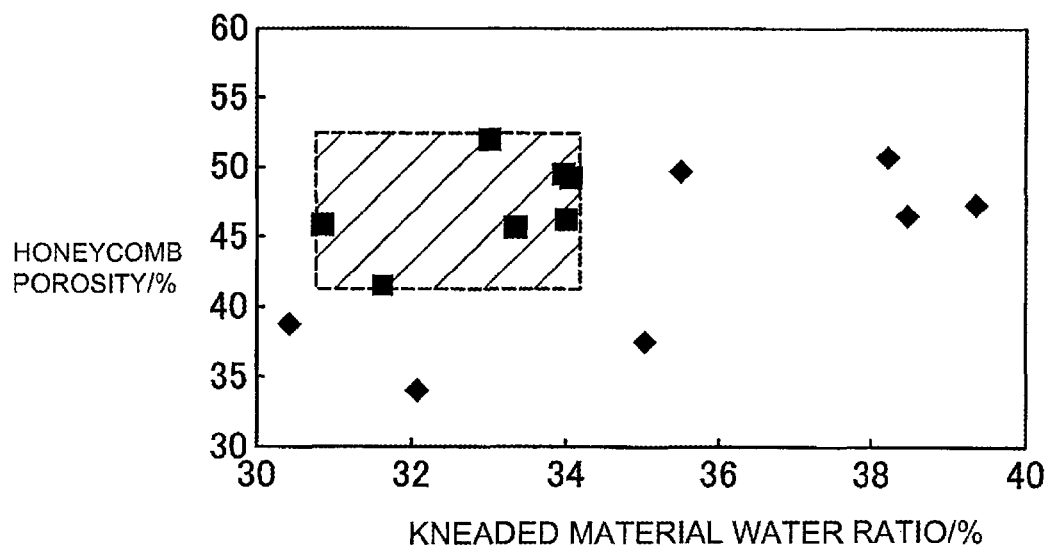
FIG. 4 is a graph showing a correlation of a porosity relative to a kneaded material water ratio.

FIG. 4 is a graph showing the kneaded material water ratio along the abscissa, showing the honeycomb porosity along the ordinate, and showing plotted results of the respective values of Examples 1 to 7 and Comparative Examples 1 to 8. In consequence, it is presumed that in the manufacturing method of the honeycomb structure of the present invention, when the kneaded material water ratio of the forming raw material and the honeycomb porosity satisfy a hatched region in the graph, it is possible to manufacture the honeycomb structure which does not have any partition wall cracks and which is excellent in light-off performance.

A manufacturing method of a honeycomb structure of the present invention is suitably usable in manufacturing a cordierite component-containing honeycomb structure which is utilizable in a car exhaust gas purifying catalyst carrier, a diesel particulate removing filter, a heat reservoir for a burning device or the like.

DESCRIPTION OF REFERENCE NUMERALS

1: honeycomb structure, 2a: one end face, 2b: the other end face, 3: cell, 4: partition wall, 5: honeycomb structure body, and 6: circumferential wall portion.

What is claimed is:

1. A manufacturing method of a honeycomb structure comprising:
    a raw material preparing step of adding powder of porous silica as an inorganic pore former to a forming raw material and kneading the forming raw material to prepare the kneaded forming raw material;
    an extruding step of extruding the obtained forming raw material to form a honeycomb formed body; and
    a firing step of firing the extruded honeycomb formed body to form the honeycomb structure containing a cordierite component and having partition walls defining a plurality of cells which become through channels for a fluid and extend from one end face to the other end face,
    wherein the porous silica is characterized by an oil absorption amount in a range of 50 to 190 ml/100 g as measured by JIS K5101-13-1 or JIS K5101-13-2, and a BET specific surface area of the porous silica is in a range of 340 to 690 m²/g.

2. The manufacturing method of the honeycomb structure according to claim 1, wherein a bulk density of the porous silica is in a range of 0.15 to 0.64 g/cm³.

3. The manufacturing method of the honeycomb structure according to claim 1, wherein a 50% particle diameter ($D_{50}$) of the porous silica is in a range of 4 to 24 μm.

4. The manufacturing method of the honeycomb structure according to claim 1, wherein a honeycomb porosity of the honeycomb structure is in a range of 40 to 55%.

5. The manufacturing method of the honeycomb structure according to claim 1,
    wherein in the firing step, the porous silica is molten, reacts with another component contained in the forming raw material to be converted into cordierite, and constitutes a part of the honeycomb structure.

* * * * *